United States Patent
Warren (10) Patent No.: US 10,153,649 B2
(45) Date of Patent: Dec. 11, 2018

(54) COMPUTING DEVICE CHARGING CASES AND METHODS OF USE

(71) Applicant: William J. Warren, Frisco, TX (US)

(72) Inventor: William J. Warren, Frisco, TX (US)

(*) Notice: Subject to any disclaimer, the term of this patent is extended or adjusted under 35 U.S.C. 154(b) by 102 days.

(21) Appl. No.: 15/252,005

(22) Filed: Aug. 30, 2016

(65) Prior Publication Data

US 2017/0005496 A1   Jan. 5, 2017

Related U.S. Application Data (63) Continuation-in-part of application No. 15/139,215, filed on Apr. 26, 2016, which is a continuation-in-part of application No. 15/008,402, filed on Jan. 27, 2016, now Pat. No. 9,627,802, which is a continuation-in-part of application No. 14/634,568, filed on Feb. 27, 2015, now Pat. No. 9,620,911.

(60) Provisional application No. 62/231,762, filed on Jul. 14, 2015, provisional application No. 61/998,497, filed on Jun. 29, 2014, provisional application No. 61/998,646, filed on Jul. 2, 2014, provisional application No. 61/998,649, filed on Jul. 3, 2014, provisional application No. 61/998,770, filed on Jul. 6, 2014, provisional application No. 62/124,684, filed on Dec. 29, 2014, provisional application No. 62/179,669, filed on May 14, 2015, provisional application No. 62/231,762, filed on Jul. 14, 2015, (Continued)

(51) Int. Cl.
| | |
|---|---|
| *H02J 7/00* | (2006.01) |
| *G06F 1/26* | (2006.01) |
| *G06F 1/16* | (2006.01) |
| *H01R 24/68* | (2011.01) |
| *H04M 1/04* | (2006.01) |

(52) U.S. Cl.
CPC ............ *H02J 7/0052* (2013.01); *G06F 1/166* (2013.01); *G06F 1/1626* (2013.01); *G06F 1/1632* (2013.01); *G06F 1/263* (2013.01); *H01R 24/68* (2013.01); *H02J 2007/0062* (2013.01); *H04M 1/04* (2013.01)

(58) Field of Classification Search
USPC ...................................................... 320/107
See application file for complete search history.

(56) References Cited

U.S. PATENT DOCUMENTS

| | | |
|---|---|---|
| 2,392,445 A | 1/1946 | Anderson |
| 4,536,694 A | 8/1985 | McCarty et al. |
| (Continued) | | |

FOREIGN PATENT DOCUMENTS

| | | |
|---|---|---|
| EP | 2228263 A1 | 9/2010 |
| WO | WO2016003585 A1 | 1/2016 |

OTHER PUBLICATIONS

International Search Report and Written Opinion dated Sep. 4, 2015 for Patent Cooperation Treaty Application PCT/US2015/034073, filed Jun. 3, 2015, 8 pages.

(Continued)

*Primary Examiner* — Robert Grant
(74) *Attorney, Agent, or Firm* — Carr & Ferrell LLP (57) ABSTRACT

Electrical charging device chassis and cases are provided herein. An example charging case includes a device receiving tray, a sliding tray having a charging interface, and a stabilizer. The sliding tray translates relative to the device receiving tray to extend and retract the charging interface using a track and gear assembly.

20 Claims, 6 Drawing Sheets

Related U.S. Application Data provisional application No. 62/330,859, filed on May 3, 2016, provisional application No. 62/330,896, filed on May 3, 2016.

(56) References Cited

U.S. PATENT DOCUMENTS

| | | |
|---|---|---|
| 5,187,744 A | 2/1993 | Richter |
| D343,107 S | 1/1994 | Fulton |
| 5,305,381 A | 4/1994 | Wang et al. |
| 5,587,645 A | 12/1996 | Sciammarella et al. |
| 5,648,712 A | 7/1997 | Hahn |
| 5,679,017 A | 10/1997 | Smith |
| 5,762,512 A | 6/1998 | Trant et al. |
| 5,903,645 A | 5/1999 | Tsay |
| 6,029,215 A * | 2/2000 | Watts, Jr. ............ G06F 1/1632 361/679.32 |
| 6,091,611 A | 7/2000 | Lanni |
| 6,341,218 B1 | 1/2002 | Poplawsky et al. |
| 6,510,067 B1 | 1/2003 | Toebes |
| 6,518,724 B2 | 2/2003 | Janik |
| 6,831,848 B2 | 12/2004 | Lanni |
| 6,848,802 B2 | 2/2005 | Chen |
| 6,861,822 B2 | 3/2005 | Wei |
| 6,938,867 B2 | 9/2005 | Dirks |
| 7,066,767 B2 | 6/2006 | Liao |
| 7,075,779 B2 | 7/2006 | Bothe et al. |
| 7,142,421 B2 | 11/2006 | Cheng et al. |
| 7,166,987 B2 | 1/2007 | Lee et al. |
| 7,254,424 B1 | 8/2007 | Reichert |
| D573,866 S | 7/2008 | Smith |
| 7,524,197 B2 | 4/2009 | Mills et al. |
| 7,528,323 B2 | 5/2009 | Wu et al. |
| 7,540,748 B2 | 6/2009 | Tracy et al. |
| 7,551,458 B2 | 6/2009 | Carnevali |
| 7,623,182 B2 | 11/2009 | Byrne et al. |
| 7,654,855 B2 | 2/2010 | Liao |
| 7,682,185 B2 | 3/2010 | Liao |
| 7,699,664 B2 | 4/2010 | Kim et al. |
| D617,863 S | 6/2010 | Moody et al. |
| 7,850,484 B2 | 12/2010 | Hayashi et al. |
| 7,857,659 B2 | 12/2010 | Wang et al. |
| 7,887,341 B2 | 2/2011 | Liao |
| 8,113,873 B1 | 2/2012 | Sarraf |
| 8,224,408 B2 | 7/2012 | Tomasini et al. |
| D676,380 S | 2/2013 | Sun |
| 8,367,235 B2 | 2/2013 | Huang |
| D680,941 S | 4/2013 | Deppen |
| 8,414,318 B1 | 4/2013 | Chen |
| 8,415,920 B2 | 4/2013 | Liao |
| D687,375 S | 8/2013 | Franco |
| 8,616,327 B1 | 12/2013 | Palacios |
| 8,686,683 B2 | 4/2014 | Caskey et al. |
| 8,712,482 B2 | 4/2014 | Sorias et al. |
| 8,794,997 B2 | 8/2014 | Tin |
| 8,805,640 B2 | 8/2014 | Nielsen et al. |
| 8,864,517 B2 | 10/2014 | Cohen |
| D719,008 S | 12/2014 | Han |
| D723,457 S | 3/2015 | Sorias |
| 9,027,486 B1 | 5/2015 | Berkovitz |
| 9,130,332 B2 | 9/2015 | Yosef |
| 9,161,464 B2 | 10/2015 | Liao |
| D745,628 S | 12/2015 | Balfoot et al. |
| 9,310,841 B2 | 4/2016 | Williams |
| 9,356,454 B2 | 5/2016 | Caren et al. |
| D760,647 S | 7/2016 | Chen |
| D762,169 S | 7/2016 | Lei |
| 9,429,994 B1 | 8/2016 | Vier |
| 9,473,607 B2 | 10/2016 | An |
| D774,377 S | 12/2016 | Hilliaho |
| D778,706 S | 2/2017 | Atkins |
| 9,568,148 B2 | 2/2017 | Carnevali |
| D783,526 S | 4/2017 | Warren |
| 9,620,911 B2 | 4/2017 | Warren |
| 9,627,802 B2 | 4/2017 | Warren |
| D791,070 S | 7/2017 | Son |
| D791,076 S | 7/2017 | Kim |
| D791,697 S | 7/2017 | Precheur |
| D792,752 S | 7/2017 | Chung et al. |
| D795,190 S | 8/2017 | Tzeng |
| 9,742,107 B2 | 8/2017 | Choi et al. |
| 9,812,811 B1 | 11/2017 | Gorin et al. |
| 9,904,327 B2 | 2/2018 | Whitt, III et al. |
| D813,339 S | 3/2018 | Maroney |
| D813,658 S | 3/2018 | Wright |
| D814,264 S | 4/2018 | Werdowatz |
| 9,997,882 B1 | 6/2018 | Warren |
| D822,598 S | 7/2018 | Warren |
| 10,027,149 B2 | 7/2018 | Warren |
| 10,063,088 B2 | 8/2018 | Warren |
| D829,651 S | 10/2018 | Warren |
| 2002/0149695 A1 | 10/2002 | Kayanuma |
| 2003/0218445 A1 | 11/2003 | Behar |
| 2004/0105024 A1 | 6/2004 | Takahashi |
| 2004/0251873 A1 | 12/2004 | Simoes et al. |
| 2005/0178633 A1 | 8/2005 | Liao |
| 2006/0105819 A1 | 5/2006 | Liao |
| 2006/0194467 A1 | 8/2006 | Beasley et al. |
| 2007/0034753 A1 | 2/2007 | Lee |
| 2007/0258204 A1 | 11/2007 | Chang et al. |
| 2008/0157715 A1 | 7/2008 | Rosenboom et al. |
| 2008/0227380 A1 | 9/2008 | Hsu et al. |
| 2009/0047827 A1 | 2/2009 | Liao |
| 2011/0031287 A1 | 2/2011 | Le Gette et al. |
| 2012/0049800 A1 | 3/2012 | Johnson et al. |
| 2012/0077361 A1 | 3/2012 | Youssefi-Shams et al. |
| 2012/0178506 A1 | 7/2012 | Sorias et al. |
| 2012/0214348 A1 | 8/2012 | Youssefi-Shams et al. |
| 2013/0057215 A1 | 3/2013 | Rajeswaran et al. |
| 2013/0093220 A1 * | 4/2013 | Pajic ............ A47C 7/70 297/163 |
| 2013/0150134 A1 | 6/2013 | Pliner et al. |
| 2013/0178252 A1 | 7/2013 | Sorias et al. |
| 2013/0242495 A1 | 9/2013 | Bathiche et al. |
| 2013/0273983 A1 | 10/2013 | Hsu |
| 2014/0030912 A1 | 1/2014 | Cohen |
| 2014/0085814 A1 | 3/2014 | Kielland |
| 2014/0139989 A1 | 5/2014 | Mori et al. |
| 2015/0011265 A1 | 1/2015 | Walsh, Jr. |
| 2015/0015204 A1 | 1/2015 | Sorias et al. |
| 2015/0207286 A1 | 7/2015 | Chen et al. |
| 2015/0207350 A1 | 7/2015 | Chen et al. |
| 2015/0234108 A1 | 8/2015 | Harley, Jr. |
| 2015/0234478 A1 | 8/2015 | Belesiu et al. |
| 2015/0263447 A1 | 9/2015 | Liao |
| 2015/0268699 A1 | 9/2015 | Bathiche et al. |
| 2015/0380872 A1 | 12/2015 | Warren |
| 2016/0087381 A1 | 3/2016 | Wong et al. |
| 2016/0090767 A1 | 3/2016 | Park et al. |
| 2016/0118758 A1 | 4/2016 | Cymerman |
| 2016/0141815 A1 | 5/2016 | Warren |
| 2016/0204816 A1 | 7/2016 | Abramovich |
| 2016/0209885 A1 | 7/2016 | Ellis |
| 2016/0218536 A1 | 7/2016 | Caren et al. |
| 2016/0261129 A1 | 9/2016 | Warren |
| 2016/0380457 A1 | 12/2016 | Criss |
| 2017/0012450 A1 | 1/2017 | Warren |
| 2017/0101256 A1 | 4/2017 | Zeitlin |
| 2017/0163080 A1 | 6/2017 | Warren |
| 2018/0248321 A1 | 8/2018 | Warren |
| 2018/0248391 A1 | 8/2018 | Warren |
| 2018/0248392 A1 | 8/2018 | Warren |

OTHER PUBLICATIONS

Office Action, dated Aug. 25, 2016, U.S. Appl. No. 14/634,568, filed Feb. 27, 2015.

Office Action, dated Sep. 12, 2016, U.S. Appl. No. 15/008,402, filed Jan. 27, 2016.

Notice of Allowance, dated Jan. 23, 2017, U.S. Appl. No. 14/634,568, filed Feb. 27, 2015.

(56) References Cited

OTHER PUBLICATIONS

Notice of Allowance, dated Feb. 1, 2017, U.S. Appl. No. 15/008,402, filed Jan. 27, 2016.

* cited by examiner

COMPUTING DEVICE CHARGING CASES AND METHODS OF USE

CROSS-REFERENCE TO RELATED APPLICATIONS

The present application is a Continuation-in-Part of U.S. patent application Ser. No. 15/139,215, filed on Apr. 26, 2016, which is a Continuation-in-Part of U.S. patent application Ser. No. 15/008,402, filed on Jan. 27, 2016, which is a Continuation-in-Part of U.S. patent application Ser. No. 14/634,568, filed on Feb. 27, 2015, which claims the benefit of U.S. Provisional Application No. 61/998,497, filed on Jun. 29, 2014, of U.S. Provisional Application No. 61/998,646, filed on Jul. 2, 2014, of U.S. Provisional Application No. 61/998,649, filed on Jul. 3, 2014, of U.S. Provisional Application No. 61/998,770, filed on Jul. 6, 2014, and of U.S. Provisional Application No. 62/124,684, filed on Dec. 29, 2014. The present application also claims the benefit of U.S. Provisional Application No. 62/330,859, filed on May 3, 2016, and of U.S. Provisional Application No. 62/330,896, filed on May 3, 2016[M], U.S. patent application Ser. No. 15/008,402 also claims the benefit of U.S. Provisional Application No. 62/179,669, filed on May 14, 2015, and of U.S. Provisional Application No. 62/231,762, filed on Jul. 14, 2015. U.S. patent application Ser. No. 15/139,215 also claims the benefit of U.S. Provisional Application No. 62/231,762 filed on Jul. 14, 2015. The present application is also related to U.S. patent application Ser. No. 15/252,018, filed on Aug. 30, 2016. All of the above applications are hereby incorporated by reference herein for all purposes including all references and appendices cited therein.

FIELD OF TECHNOLOGY

The present technology pertains to charging cases for electronic devices such as Smartphones, and more specifically, but not by way of limitation, to charging cases that comprise a static or deployable DC or AC electrical connector (such as USB or electrical prongs) that extends from a compartment of the charging cases using a track and gear assembly.

SUMMARY

According to some embodiments, the present technology is directed to a charging apparatus for a computing device, the charging apparatus comprising: (a) a device receiving tray that receives a computing device; (b) a sliding tray that is disposed underneath the device receiving tray, the sliding tray configured to slide along the underneath the device receiving tray, the sliding tray comprising: (i) a charging interface that receives power from a power source; (ii) a charging circuit that receives power and provides an electrical charge to the computing device; and (iii) a grooved track; (c) a stabilizer tray that is disposed underneath the sliding tray, the stabilizer tray also in sliding relationship with the sliding tray, the stabilizer tray further comprising a stabilizer; and (d) a gear having teeth that cooperate with the grooved track such that when the gear is rotated, the teeth of the gear translate the sliding tray backwards and forwards to retract or extend the sliding tray and the charging interface.

According to some embodiments, the present technology is directed to a charging apparatus for a computing device, the charging apparatus comprising: (a) a sliding tray comprising: (i) a charging interface that receives power from a power source; (ii) a charging circuit that receives power and provides an electrical charge to a computing device associated with the charging apparatus; and (iii) a grooved track; (b) a stabilizer tray that is disposed underneath the sliding tray, the stabilizer tray also in sliding relationship with the sliding tray, the stabilizer tray further comprising a stabilizer; and (c) a gear having teeth that cooperate with the grooved track such that when the gear is rotated, the teeth of the gear translate the sliding tray backwards and forwards to retract or extend the sliding tray and the charging interface.

According to some embodiments, the present technology is directed to an assembly comprising: (a) a first tray that receives and retains a computing device; (b) a second tray disposed below the first tray, the second tray comprising a charging interface that charges the computing device when engaged with a power source, the second tray configured to translate between an extended position and a retracted position by operation of a track and gear assembly associated with the second tray; and (c) a third tray disposed below the second tray, the third tray comprising a deployable stabilizer.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally described, the present technology involves devices that are used to charge electronic devices. Example types of electronic devices that can be charged using the present technology include, but are not limited to, cellular telephones, Smartphones, PDAs, tablets, phablets, laptops, or any other mobile electronic device that requires recharging through an electrical interface or charging port, using any of direct current and/or alternating current.

FIGS. 1A-2A collectively illustrate an example apparatus or charging device 100 of the present disclosure (also referred to herein as charging apparatus 100 or device 100). The charging device 100 can be utilized to charge a computing device, such as computing device 102 associated with the charging device 100.

Figure 1A:
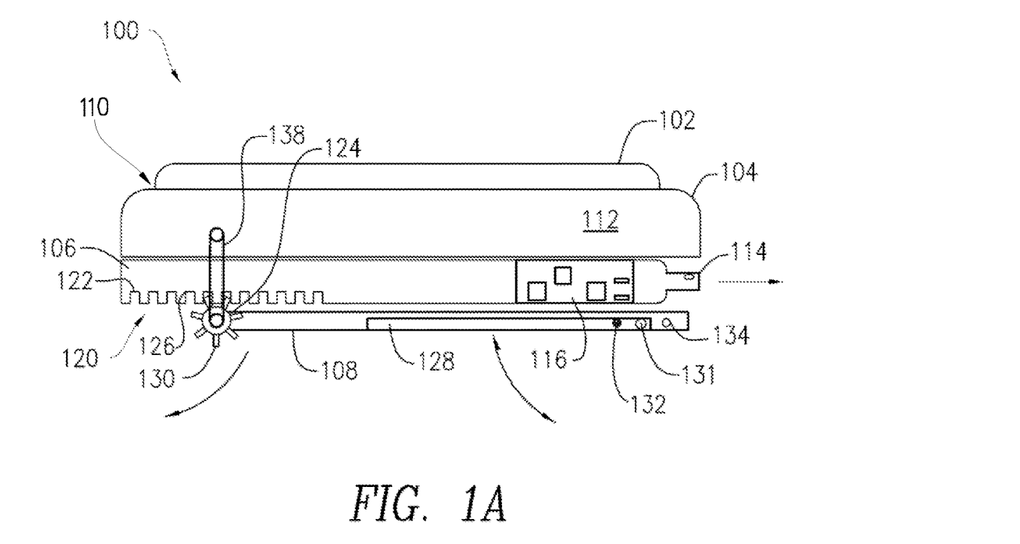
FIG. 1A is a cross sectional view of an example device of the present disclosure with components in a stored configuration.
Figure 1B:
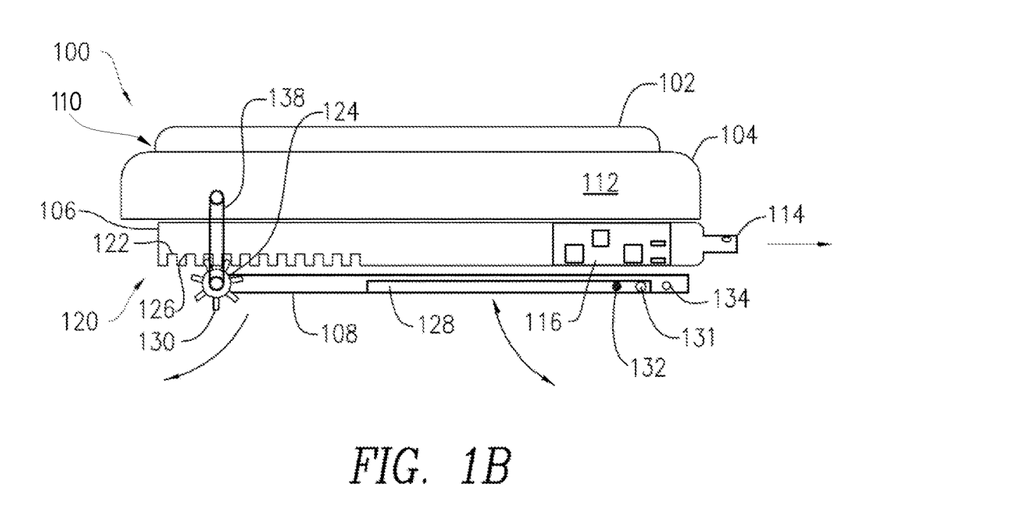
FIG. 1B is a cross sectional view of an example device of the present disclosure with components in a deployed configuration.
Figure 2A:
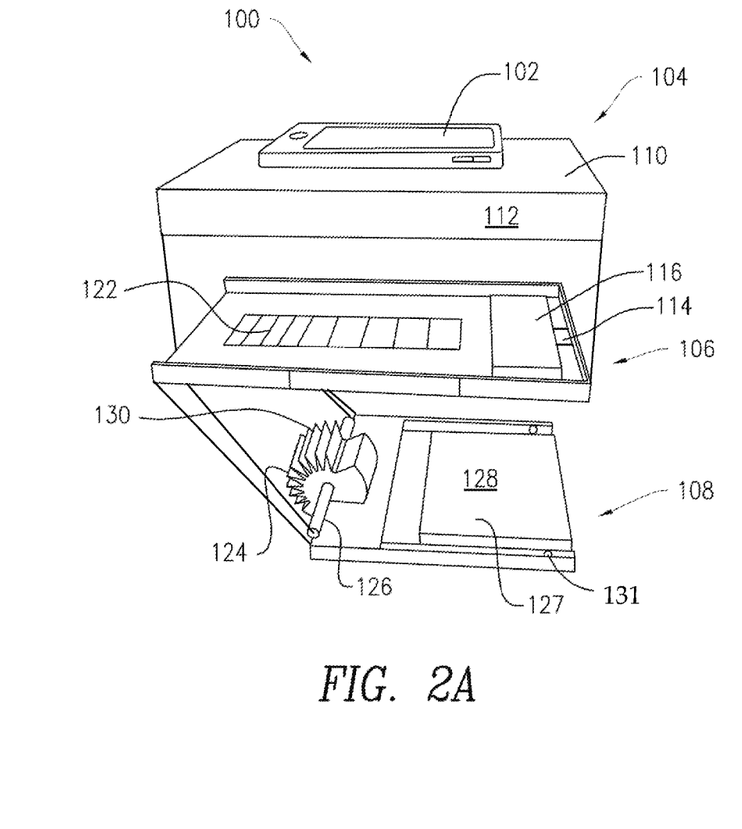
FIG. 2A is an exploded view of the example device of FIGS. 1A-1B.

In general, charging device 100 may comprise a series of stacked trays or layers where at least one of the trays comprises a charging interface or assembly that can be extended and retracted. When extended, the charging interface can be plugged into an AC or DC power source depending on the type of charging interface. For example, a charging interface comprising a USB port can be used when DC power is available. In another example, a charging interface comprising electrical prongs can be used when AC power is available.

Some embodiments comprise a stabilizer plate or device that can be stored and deployed to support a portion of the weight of the charging device 100 and/or computing device 102 associated therewith.

In one embodiment, the charging device 100 comprises three distinct trays or enclosures such as a device receiving tray 104, a sliding tray 106, and a stabilizer tray 108. In some embodiments, the device receiving tray 104 receives the computing device 102. For example, the device receiving tray 104 comprises a support plate 110 and a sidewall 112 that extends around a periphery of the support plate 110. The computing device 102 resides within the area enclosed by the sidewall 112.

According to some embodiments, the sliding tray 106 is disposed underneath the device receiving tray 104. The sliding tray 106 is configured to slide along an underneath the device receiving tray 104. In various embodiments, the sliding tray 106 and the device receiving tray 104 may be hingedly coupled at one or more points. In other embodiments, the sliding tray 106 and the device receiving tray 104 may be coupled at one or more points along a periphery of the sliding tray 106 and the device receiving tray 104.

In some embodiments, the sliding tray 106 comprises a charging assembly that comprises a charging interface 114 that receives power from a power source. The charging device 100 is illustrated in association with a power source, such as a wall outlet in FIG. 5.

In one embodiment, the charging interface is selected from any of electrical prongs and a USB connector (either disposed in vertical or horizontal orientation). Other types of connectors/electrical conductors can also be utilized such as micro USB and firewire connectors.

In some embodiments, the sliding tray 106 comprises a charging circuit 116 that receives power and provides an electrical charge to the computing device 102.

Figure 3:
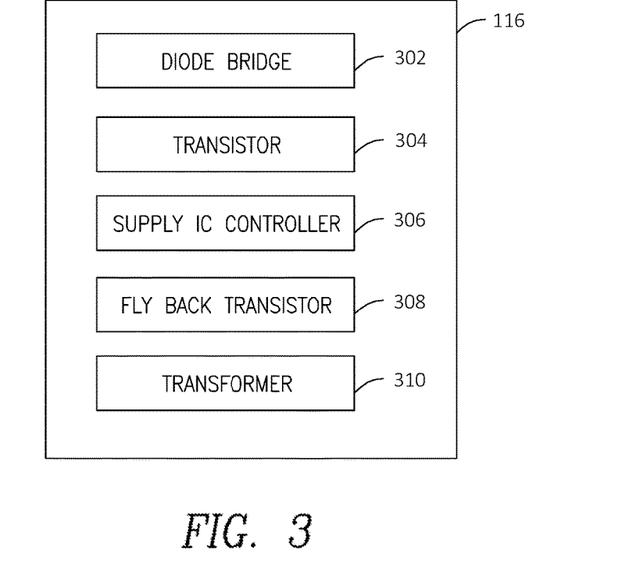
FIG. 3 is an example charging circuit for use in the example devices of the present disclosure.
Figure 4:
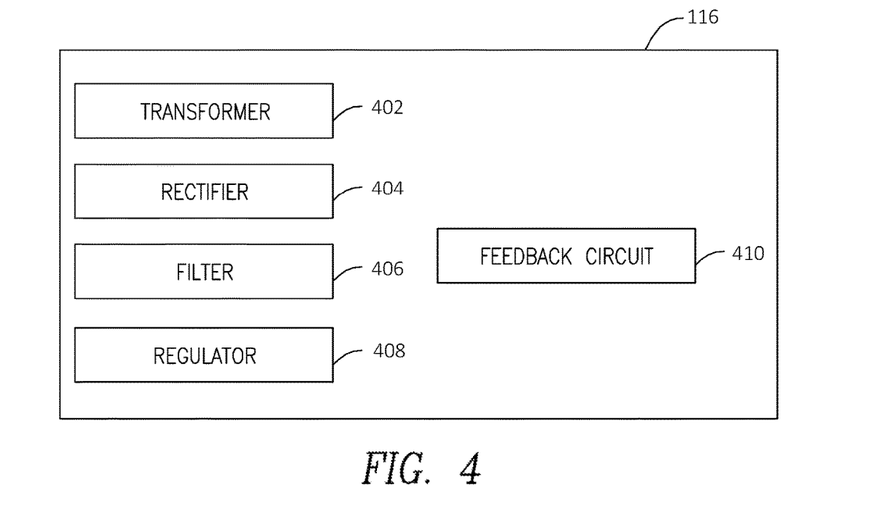
FIG. 4 is another example charging circuit for use in the example devices of the present disclosure.

FIGS. 3 and 4 illustrate two example circuits that can be used to process the AC or DC power received from a power source so as to provide the computing device 102 with a suitable electrical charge based on the requirements of the computing device.

As illustrated in FIG. 3, according to some embodiments, the charging circuit 116 can comprise a printed circuit board with various permutations of electrical components. In general, the charging circuit 116 is configured to transform the AC power waveform received from an outlet into DC power that is appropriate for charging the electronic device.

In some embodiments, the charging circuit 116 can include combinations of electrolytic capacitors, MOSFET switching transistors, flyback transformers, a controller integrated circuit, capacitors, diodes, R-C snubber circuits, EMI (electromagnetic interference) circuits, inductors, control chips, Schottky diodes, Tantalum filter capacitors, as well as any combinations thereof, in order to provide the desired transformation of AC to DC functions.

In some embodiments, the charging circuit 116 is an advanced flyback switching power supply that receives the AC voltage in ranges of 100 to 240 volts, and produces approximately five watts of smooth voltage power. AC line power is converted to high voltage DC current using a diode bridge 302. The DC power is switched off and on by a transistor 304 controlled by a power supply IC controller 306. The charging circuit 116 can also comprise a fly back transistor 308, and/or a transformer 310 that converts the DC power to a low voltage AC waveform.

In other embodiments, a chopped DC power supply is fed back into a transformer 310 (which can include a fly back transformer), which converts the DC power to a low voltage AC waveform. The AC waveform is then converted into DC using a rectifier and then filtered with a filter to obtain smooth power that is substantially free of interference. This smoothed power is provided to a USB port (e.g., charging interface 114 of FIG. 1A).

While the use of a USB port is contemplated, the charging interface can be selectively changed depending upon the type of electrical device that needs to be charged. Other examples include power over Ethernet, firewire, MIDI, Thunderbolt, and so forth.

In another example circuit, illustrated in FIG. 4, the charging circuit 116 comprises a transformer 402 that performs a step down of the AC voltage received from an outlet to a working output voltage. A rectifier 404 then converts the stepped down voltage from AC to DC. In some embodiments, the rectifier 404 is a full wave bridge rectifier. A filter 406, such as a capacitor may be used to smooth the DC voltage. A regulator 408 can also be employed to even further smooth the DC current. For example, a zener diode or IC voltage regulator can be utilized. The charging circuit 116 can comprise a feedback circuit 410 that measures the voltage output to the charging interface 114 and sends a signal to the power supply IC controller, which adjusts the switching frequency to obtain a desired voltage.

The circuits of FIGS. 3 and 4 are merely example circuits that can be used to transform the AC power received at a wall outlet to a DC power feed that can be used to charge an electronic device without causing any damage to the circuitry of the electronic device. In some embodiments components from the circuits of FIGS. 3 and 4 can be combined into a single circuit.

To be sure, the charging circuit 116 can also be configured to amplify or reduce DC power received from an electrical outlet. In one embodiment, the electrical outlet includes a USB port that is configured to deliver DC power. Some embodiments of USB connectors, and specifically wall outlet based USB connections may carry AC power. Thus, the charging circuit 116 can be configured with any of the components of FIGS. 3 and 4 above to deliver the correct type of power.

In some embodiments, the charging circuit 116 can be omitted all together, such as when the DC source provides a DC power signal that does not require amplification or any signal processing.

Rather than plugging into a USB electrical outlet, the electrical connector can be coupled with a USB port of another computing device, such as a laptop computer or a charger device that plugs into a standard two or three pronged electrical wall outlet.

Referring back to FIGS. 1A-2A, in some embodiments, the sliding tray 106 comprises a support plate 110 having an integrated track 120. The track 120 is comprised of an alternating series of notches, such as notch 122, which create an approximate saw tooth configuration. The shape, size, number, and spacing of the notches depend on a tooth profile gear 124. The track 120 and gear 124 cooperate to create a track and gear assembly that functions to extend and retract the sliding tray by cooperative operation of the track 120 and gear 124, as will be discussed in greater detail below.

In some embodiments, the stabilizer tray 108 is disposed underneath the sliding tray 106. The stabilizer tray 108 is also in sliding relationship with the sliding tray 106. That is, the sliding tray 106 can translate backwards and forwards relative to the device receiving tray 104 and the stabilizer tray 108.

In some embodiments, the gear 124 comprises teeth 130 that cooperate with the grooved track 120 such that when the gear 124 is rotated, the teeth 130 of the gear translate the sliding tray 106 either backwards and forwards to retract or extend the sliding tray 106 and the charging interface 114.

The teeth 130 of the gear 124 are sized to cooperate with the grooved track 120 to drive the sliding tray 106 extension and/or retraction. In one embodiment, the gear 124 rotates on a gear shaft 126. The gear shaft 126 can be fixedly but rotatably coupled to the stabilizer tray 108. A portion of the teeth 130 of the gear 124 extend at least partially below the stabilizer tray 108 to allow the user to rotate the gear 124.

In one embodiment, the stabilizer tray 108 is hingedly coupled with the sliding tray 106 in such a way that the gear 124 can remain in contact with the track 120 at all times. In another embodiment, the stabilizer tray 108 is hingedly coupled with the sliding tray 106 so that the gear 124 can remain in contact with the track 120 when the stabilizer tray 108 is folded into contacting relationship with the sliding tray 106.

In one embodiment, the stabilizer bar 131 is coupled with the device receiving tray 104 using, for example, an armature 138. The armature 138 holds the device receiving tray 104 and stabilizer tray 108 in connected relationship to one another, while allowing the sliding tray 106 to slide therebetween.

In some embodiments, rotation of the gear 124 in a first direction (e.g., clockwise) causes the sliding tray 106 to translate forwardly to extend the charging interface 114 into a deployed position. Likewise, rotation of the gear 124 in a second direction (e.g., counter-clockwise) causes the sliding tray 106 to translate backwardly to retract the charging interface 114 into a stored position (see FIG. 1A).

Thus, in some embodiments, the stabilizer tray 108 can hinge between a mating configuration (see FIG. 1A) where the stabilizer tray 108 abuts the sliding tray 106. In other embodiments, the stabilizer tray 108 can be hinged away from the sliding tray 106 in a deployed configuration, such as when the charging apparatus 100 is connected to a power source.

In one embodiment, the stabilizer tray 108 may be hingedly coupled with the sliding tray 106. In another embodiment, the stabilizer tray 108 may be connected to the sliding tray 106 via a pivot point hinge. In some embodiments, the stabilizer tray 108 and the sliding tray 106 may be hingedly coupled at one or more points. In other embodiments, the stabilizer tray 108 and the sliding tray 106 may be coupled at one or more points along a periphery of the stabilizer tray 108 and the sliding tray 106.

In one embodiment, the stabilizer tray 108 comprises a stabilizer 127 is a plate 128 that is hingedly associated with a stabilizer bar 131 of the stabilizer tray 108.

Figure 2B:
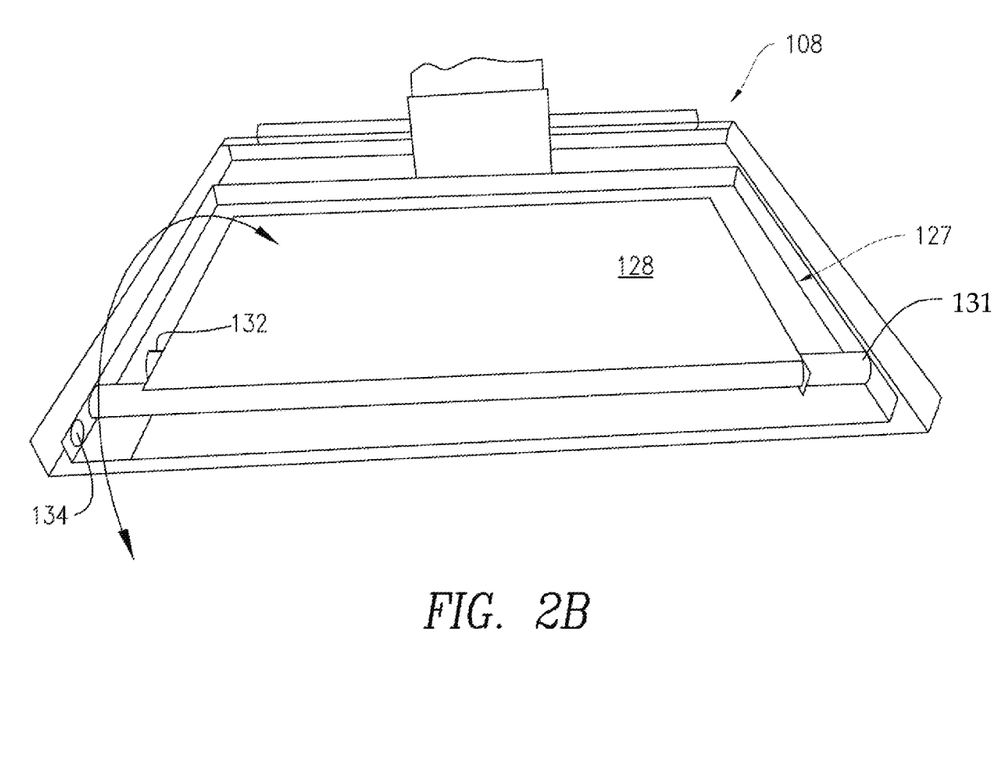
FIG. 2B is a front perspective view of a stabilizer tray of the example device of FIGS. 1A-2A in an unlocked configuration.
Figure 2C:
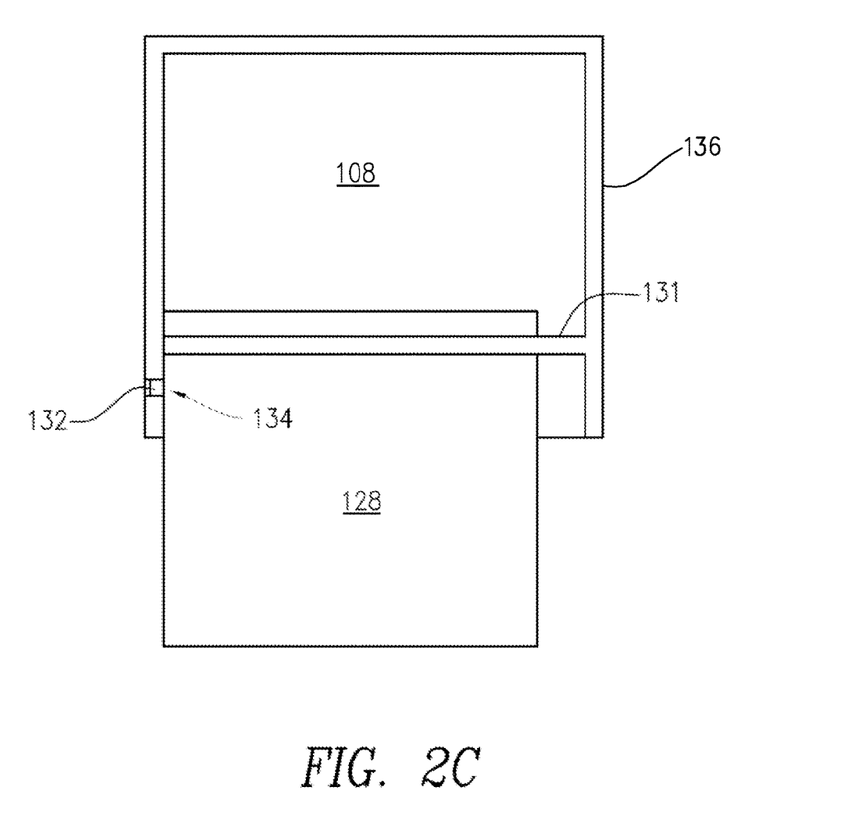
FIG. 2C is a front perspective view of a stabilizer tray of the example device of FIGS. 1A-2B in a locked configuration.

As illustrated in FIGS. 2B-2C, the stabilizer 127 can rotate from a stored position (see FIG. 1A) within the stabilizer tray 108 and a deployed position as illustrated in FIG. 1B. The stabilizer 127 rotates about the stabilizer bar 131.

In some embodiments, the stabilizer 127 selectively slides in a lateral movement along the stabilizer bar 131 between a locked position (see FIG. 2C) and an unlocked position (see FIG. 2B). In one embodiment, the stabilizer 127 comprises a peg 132 on an edge thereof that engages with an aperture 134 in a sidewall 136 of the stabilizer tray 108 to lock the stabilizer 127 in position. The stabilizer 127 is slid away from the aperture 134 to unlock the stabilizer 127. The stabilizer 127 can then be rotated back into a stored position within the stabilizer tray 108.

When assembled, the device 100 allows for translation of the sliding tray 106 between two different positions, both extended and retracted. Movement of the sliding tray 106 causes movement of the charging interface 114 due to the mounting or association of the charging interface 114 with the sliding tray 106.

In some embodiments, the sliding tray 106 can slide relative to both the device receiving tray 104 and the stabilizer tray 108, while the device receiving tray 104 and the stabilizer tray 108 remain stationary. This movement of the sliding tray 106 allows for selective deployment and storage of the charging interface 114.

Figure 5:
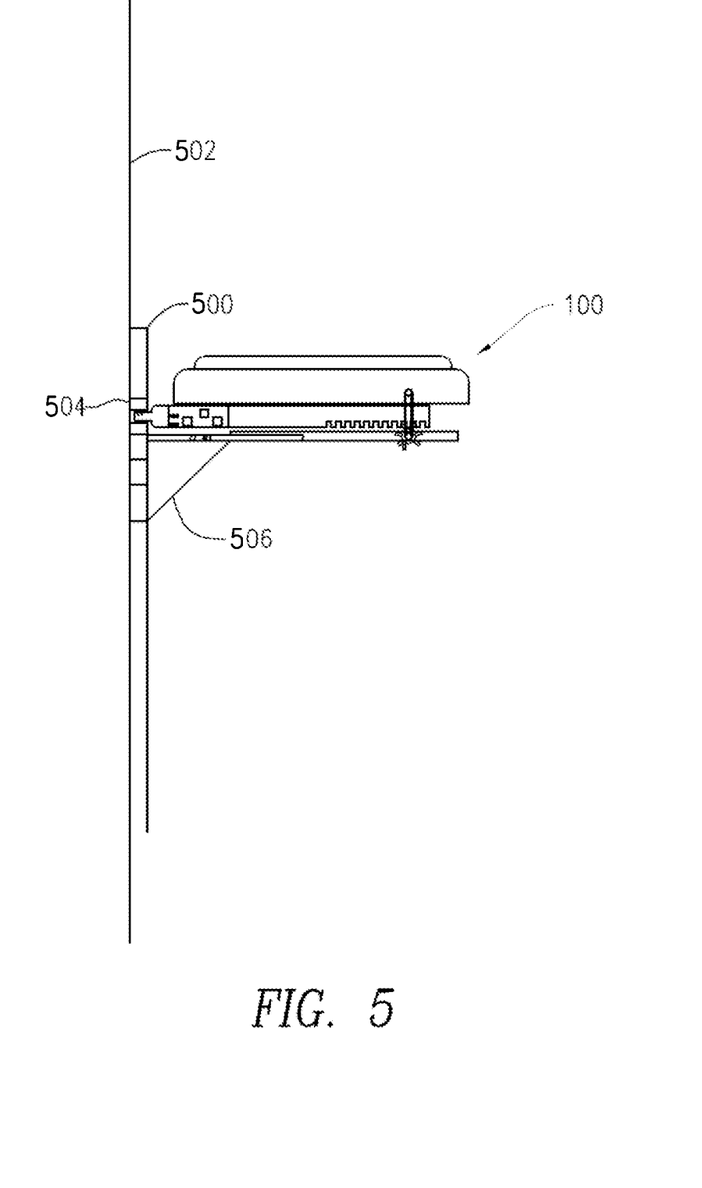
FIG. 5 is a side elevation view of the example device in association with a power source, such as a wall outlet.

FIG. 5 illustrates an example embodiment of the charging apparatus 100 of FIG. 1 in use. For example, the charging apparatus 100 can be coupled with an electrical outlet 500 of a wall 502. The wall 502 is a vertically oriented surface that supports the charging apparatus 100. When the charging interface 504, such as electrical prongs, is inserted into the electrical outlet 500, a stabilizer 506, when in the deployed configuration, contacts a portion of the wall 502 below the electrical outlet 500 or the electrical outlet 500 itself. Again, the stabilizer 506 supports at least a portion of the weight of the charging apparatus 100 and the computing device disposed therein.

The present disclosure has been described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity, at least as described herein, in any manner, irrespective of the at least one entity have any relationship to the subject matter of the present disclosure.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases in "one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," an and the are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A charging apparatus for a computing device, the charging apparatus comprising:
    a device receiving tray that receives a computing device;
    a sliding tray that is disposed underneath the device receiving tray, the sliding tray configured to slide along underneath the device receiving tray, the sliding tray comprising:
        a charging interface that receives power from a power source;
        a charging circuit that receives power and provides an electrical charge to the computing device; and
        a grooved track;
    a stabilizer tray that is disposed underneath the sliding tray, the stabilizer tray also in sliding relationship with the sliding tray, the stabilizer tray further comprising a stabilizer; and
    a gear having teeth that cooperate with the grooved track such that when the gear is rotated, the teeth of the gear translate the sliding tray backwards and forwards to retract or extend the sliding tray and the charging interface.

2. The charging apparatus according to claim 1, wherein the charging interface comprises electrical prongs or a universal serial bus (USB) connector.

3. The charging apparatus according to claim 1, wherein the stabilizer is a plate that is hingedly associated with a stabilizer bar of the stabilizer tray.

4. The charging apparatus according to claim 3, wherein the stabilizer is a plate that can selectively slide along the stabilizer bar between a locked position and an unlocked position.

5. The charging apparatus according to claim 4, wherein the stabilizer comprises a peg on an edge of the plate that engages with an aperture in a sidewall of the stabilizer tray to lock the plate in an extended configuration when the plate is slid into the locked position.

6. The charging apparatus according to claim 4, wherein the stabilizer tray is hingedly coupled with the sliding tray.

7. The charging apparatus according to claim 1, further comprising a means for coupling the computing device to the charging circuit.

8. The charging apparatus according to claim 1, wherein the charging interface comprises either an alternating current (AC) conductor or a direct current (DC) conductor.

9. The charging apparatus according to claim 1, wherein the gear extends through and below an underside of the stabilizer tray.

10. The charging apparatus according to claim 1, wherein rotation of the gear in a first direction causes the sliding tray to translate forwardly to extend the charging interface into a deployed position.

11. The charging apparatus according to claim 10, wherein rotation of the gear in a second direction causes the sliding tray to translate backwardly to retract the charging interface into a stored position.

12. A charging apparatus for a computing device, the charging apparatus comprising:
    a sliding tray comprising:
        a charging interface that receives power from a power source;
        a charging circuit that receives power and provides an electrical charge to a computing device associated with the charging apparatus; and
        a grooved track;
    a stabilizer tray that is disposed underneath the sliding tray, the stabilizer tray also in sliding relationship with the sliding tray, the stabilizer tray further comprising a stabilizer that is a plate hingedly associated with a stabilizer bar of the stabilizer tray, the plate configured to selectively slide along the stabilizer bar between a locked position and an unlocked position; and
    a gear having teeth that cooperate with the grooved track such that when the gear is rotated, the teeth of the gear translate the sliding tray backwards and forwards to retract or extend the sliding tray and the charging interface.

13. The charging apparatus according to claim 12, further comprising a device receiving tray disposed above the sliding tray, wherein the device receiving tray receives and retains the computing device.

14. The charging apparatus according to claim 12, wherein the charging interface comprises electrical prongs or a universal serial bus (USB) connector.

15. The charging apparatus according to claim 12, wherein the stabilizer comprises a peg on an edge of the plate that engages with an aperture in a sidewall of the stabilizer tray to lock the plate in an extended configuration when the plate is slid into the locked position.

16. An assembly, comprising:
a first tray that receives and retains a computing device;
a second tray disposed below the first tray, the second tray comprising a charging interface that charges the computing device when engaged with a power source, the second tray configured to translate between an extended position and a retracted position by operation of a track and gear assembly associated with the second tray; and
a third tray disposed below the second tray, the third tray comprising a deployable stabilizer that is a plate hingedly associated with a stabilizer bar of the third tray, the plate configured to selectively slide along the stabilizer bar between a locked position and an unlocked position.

17. The assembly according to claim 16, wherein the charging interface comprises electrical prongs or a universal serial bus (USB) connector.

18. The assembly according to claim 16, further comprising a means for coupling the computing device to the power source.

19. The assembly according to claim 16, wherein a gear of the track and gear assembly extends through and below an underside of the third tray.

20. The assembly according to claim 16, wherein the third tray is hingedly coupled with the second tray.

* * * * *